United States Patent [19]
Berggren et al.

[11] Patent Number: 6,073,015
[45] Date of Patent: Jun. 6, 2000

[54] SYSTEM AND METHOD OF PROVIDING SERVICES WHEN THE MOBILE IS HOME REGISTERED IN A MICROCELLULAR NETWORK AND RECEIVES SUPPORT FROM A MACROCELLULAR NETWORK

[75] Inventors: Karl Viktor Berggren, Sollentuna; Ingvar Emil Liljeros, Upplands Väsby, both of Sweden

[73] Assignee: Telefonaktiebolaget L M Ericsson (Publ), Stockholm, Sweden

[21] Appl. No.: 08/680,225

[22] Filed: Jul. 11, 1996

[51] Int. Cl.[7] .......................................... H04Q 7/38
[52] U.S. Cl. ................................ 455/432; 455/465
[58] Field of Search ...................... 455/432, 433, 455/435, 436, 438, 439, 440, 444, 445, 461

[56] References Cited

U.S. PATENT DOCUMENTS

| | | | |
|---|---|---|---|
| 5,307,400 | 4/1994 | Sawyer et al. | 455/435 |
| 5,428,665 | 6/1995 | Lantto | 455/432 |
| 5,493,696 | 2/1996 | Wolf | 455/433 |
| 5,509,052 | 4/1996 | Chia et al. | 455/435 |
| 5,521,961 | 5/1996 | Fletcher et al. | 455/432 |
| 5,537,610 | 7/1996 | Mauger et al. | 455/433 |
| 5,548,586 | 8/1996 | Kito et al. | 455/433 |
| 5,557,655 | 9/1996 | Lantto | 455/432 |
| 5,561,840 | 10/1996 | Alvesalo et al. | 455/433 |
| 5,590,174 | 12/1996 | Tsuji et al. | 455/432 |
| 5,670,950 | 9/1997 | Otsuka | 455/432 |
| 5,805,078 | 9/1998 | Sugiyama et al. | 455/432 |
| 5,812,950 | 9/1998 | Tom | 455/440 |
| 5,815,810 | 9/1998 | Gallant et al. | 455/432 |

FOREIGN PATENT DOCUMENTS

| | | |
|---|---|---|
| WO 95/27382 | 10/1995 | WIPO . |
| WO 95/33348 | 12/1995 | WIPO . |
| WO 96/18273 | 6/1996 | WIPO . |

OTHER PUBLICATIONS

O'Connell. Dual mode GSM/DECT Handset. IEEE colloquium on Radio Frequency Design in Mobile Radio Tranceivers, 1994.

Nodera et al. Internetworking between GSM and PDC through IC Cards. 1995 IEEE International Conference on Communications. vol. 2, pp. 761–765, Jun. 1995.

Geiger et al. Wiress Network Extension using Mobile IP. COMPCON '96: IEEE Computer Society Internation Conference. 9–14, 1996.

Agrawal et al. SWAN: A Mobile multimedia wireless network. IEEE Personal Communications Magazine. Vol. 3, Issue 2. 18–33, Apr. 1996.

Hirata et al. PDC mobile packet data communication network. Universl Personal Communications. 1995 4th International Conference. 644–648, 1995.

Mazoni et al. Impact of mobility on TCP/IP: an integrated performance study. IEEE Journal on Selected Areas in Communications. Vol. 13, Issue 5. 858–867, Jun. 1995.

*Primary Examiner*—Emanuel Todd Voeltz
*Assistant Examiner*—M. David Sofocleous
*Attorney, Agent, or Firm*—Jenkens & Gilchrist, A Professional Corporation

[57] ABSTRACT

A method and apparatus for facilitating communications with a roaming mobile subscriber unit which roams beyond a microcellular communication network, such as a Digital Electronic Cordless Telephone (DECT) system. A mobility server of the microcellular communication networks is coupled to a macrocellular communication network, such as a Global System for Mobile communications (GSM) network. Wide-area mobility management functions of the macrocellular communication network are provided to the microcellular communication network and are used to facilitate call routing to and from the roaming, mobile subscriber unit.

17 Claims, 4 Drawing Sheets

SYSTEM AND METHOD OF PROVIDING SERVICES WHEN THE MOBILE IS HOME REGISTERED IN A MICROCELLULAR NETWORK AND RECEIVES SUPPORT FROM A MACROCELLULAR NETWORK

The present invention relates generally to mobility management of a mobile subscriber unit operable in a microcellular communication network, such as a Digital Electronic Cordless Telephone (DECT) system or other Private Telephone Network (PTN). More particularly, the present invention relates to a method, and associated apparatus, for facilitating communications to and from the mobile subscriber unit pursuant to the microcellular communication network when the mobile subscriber unit roams into an area encompassed by a communication network other than the "home" microcellular communication network in which the mobile subscriber unit is regularly registered.

The microcellular communication networks are interfaced with a macrocellular communication network, such as a Global System for Mobile communications (GSM) or other Public Land Mobile Network (PLMN). Wide-area, mobility management functions existent in the macrocellular communication network are utilized by the microcellular communication network to provide wide-area mobility management to the microcellular communication network. Wide-area mobility of the mobile subscriber unit is permitted as the wide-area mobility management functions of the macrocellular communication network are used to facilitate the communication with the mobile subscriber unit. When the mobile subscriber unit roams beyond an area encompassed by the microcellular communication network in which the mobile subscriber unit is regularly registered, calls can still be routed to and from the mobile subscriber unit.

When the macrocellular communication network is formed of a GSM network, a mobility server positioned in the microcellular communication network is coupled to the GSM network and appears to the GSM network as a mobile services switching center (MSC) thereof. The wide-area, mobility management functions are used by the mobility servers of both the subscriber unit's "home" network and the "visited" network into which the subscriber unit roams thereby to provide wide-area mobility to the mobile subscriber unit.

Communications between the microcellular and macrocellular communication networks are also permitted to be effectuated by way of the Internet. Data to be communicated between the networks is encapsulated according to an Internet protocol, or the like.

BACKGROUND OF THE INVENTION

Advancements in the fields of electronics and communications have permitted the introduction and commercialization of many new types of communication systems. Information can be affordably communicated to locations and in manners previously not possible or affordable.

The field of cellular telephony is exemplary of a communication system that has been made possible due to such advancements. A fixed, wireline connection is not required between a transmitting station and a receiving station in a cellular, or other radiotelephonic, communication system to effectuate communications between the stations. Because a "wireless" connection is formed between the transmitting station and the receiving station, use of such a communication system is particularly advantageous to effectuate communications when a wireline connection cannot be conveniently or practically formed.

Various different types of cellular, and other radiotelephonic, communication systems have been implemented and others have been proposed. In many parts of the world, for instance, macrocellular communication networks have been installed. Such networks permit mobile subscriber units positioned anywhere within the area encompassed by the macrocellular networks to communicate pursuant to the macrocellular communication network. A macrocellular communication network typically includes a large number of base stations positioned at spaced-apart locations throughout a geographic area. As a mobile subscriber unit moves throughout the geographical area, communications with the mobile subscriber unit are "handed-off" to successive ones of the base stations. In one type of cellular communication system, a Global System for Mobile (GSM) communications system, control circuitry, including mobile services switching centers (MSCs) and base stations controllers (BSCs), controls communications between the base stations and the mobile subscriber unit. And, location registers, including a home location register (HLR) associated with the mobile subscriber unit, maintain a registry of the positioning of the mobile subscriber unit in a network.

Microcellular communication networks have also been developed and implemented. A Digital Electronic Cordless Telephone (DECT) system is exemplary of a microcellular communication network. A microcellular communication network, analogous to a macrocellular communication network, also permits wireless communications to be effectuated with a mobile subscriber unit. The area encompassed by a microcellular communication network is, however, typically much smaller than the area encompassed by a macrocellular communication network.

The costs associated with a microcellular communication network are generally less than the costs associated with a macrocellular communication network. However, because microcellular communication networks generally encompass limited areas, a single business, or other operator, might be required to construct more than one microcellular communication network to encompass a desired area in which microcellular communications are to be permitted.

For instance, a microcellular communication network might be constructed to provide microcellular communication coverage encompassing a single building. A mobile subscriber unit regularly registered to communicate pursuant to the microcellular communication network must be within the building, i.e., the area encompassed by the microcellular communication network, to communicate therethrough.

It is sometimes desirable to permit a mobile subscriber unit, regularly registered in one microcellular communication network (the "home" network), also to communicate in another microcellular communication network (the "visited" network). For instance, a business might have separate office locations, requiring separate microcellular networks to be installed for each of the separate office locations. It is sometimes desirable, in such instances, to permit personnel regularly located at one of the office locations to be able to communicate by way of a microcellular communication network even when the personnel are temporarily positioned at the other one of the office locations.

By providing communication links between the separate microcellular networks, registration, and other, information pertaining to the mobile subscriber unit stored at the "home" microcellular communication network can be used to permit communications with the mobile subscriber unit, even when the mobile subscriber unit is positioned in an area encompassed by the "visited" microcellular communication network.

Various proposals have been set forth to form communication links between microcellular networks by way of a macrocellular communication network. Such proposals, however, have generally been set forth for purposes of call control and not for purposes of mobility management. Viz. existing proposals for intercoupling the networks have not generally pertained to providing wide-area mobility to mobile subscriber units of microcellular communication networks.

Additionally, existing proposals generally require direct connections between the microcellular and macrocellular communication networks. As the operators of the macrocellular and microcellular communication networks might well be different entities, the conventional requirement for direct connections between the microcellular communication networks might sometimes be problematical.

A manner by which better to provide wide-area mobility to a mobile subscriber unit to increase the mobility permitted of the mobile subscriber unit would be advantageous.

Additionally, a manner by which to provide for the communication of mobility management information between a microcellular and macrocellular communication network without requiring direct connections therebetween would also be advantageous.

It is in light of this background information related to mobility management in a cellular communication system that the significant improvements of the present invention have evolved.

SUMMARY OF THE INVENTION

The present invention advantageously provides a method, and associated apparatus, for facilitating communications to and from a mobile subscriber unit operable in a microcellular communication network when the mobile subscriber unit roams into an area encompassed by a "visited" microcellular communication network other than the "home" network in which the mobile subscriber unit is regularly registered.

Wide-area mobility management functions available in a macrocellular network are provided to microcellular networks by coupling the microcellular networks to the macrocellular network. Wide-area mobility is thereby provided to a mobile subscriber unit operable in a microcellular communication network. The wide-area management functions provided to the microcellular communication network permits a mobile subscriber unit to communicate by way of a microcellular communication network even when it roams into an area encompassed by a "visited" network.

When the macrocellular communication network is formed of a Global System for Mobile communications (GSM) network, the microcellular communication networks include the mobility servers which appear, to the GSM network, to be mobile services switching centers (MSCs) of the GSM network. Mobility management normally provided to the mobile services switching centers of the GSM network are provided to the mobility servers of the microcellular networks. Signaling between the mobility server and the macrocellular communication network permits, for example, calls to be placed to and from a mobile subscriber unit when the subscriber unit roams beyond the microcellular communication network in which the subscriber unit is regularly registered. Location updating of the position at which the subscriber unit roams is similarly also effectuated.

In one aspect of the present invention, location information related to the position of a mobile subscriber unit is updated when the mobile subscriber unit roams into an area encompassed by a microcellular communication network other than the network in which the subscriber unit is regularly registered. A mobility server of such "visited" microcellular network receives indications of the positioning of the subscriber unit and provides information indicative thereof to a home location register (HLR) of the macrocellular communication network. The home location register (HLR) provides the visited mobility server with subscriber data related to the mobile subscriber unit and orders the "home" mobility server of the subscriber unit's home network to deregister the subscriber unit therefrom.

In an another aspect of the present invention, calls originated at a Public Switched Telephone Network (PSTN) to be terminated to a mobile subscriber unit of the "home" microcellular communication network are routed to the subscriber unit when the subscriber unit roams beyond the "home" network and into a "visited" network. In one exemplary routing method, the call is routed via the home microcellular communication network to a gateway mobile services switching center (GMSC) of the macrocellular communication network, and the GMSC interrogates the home location register of the macrocellular network to obtain routing information to route the call to the roaming, subscriber unit. The HLR requests and receives information from the mobility server of the "roaming" microcellular network. Such information is provided to the GMSC, and the call is routed to the mobile subscriber unit, to be terminated thereat.

In another aspect of the present invention, a call originated at a roaming, subscriber unit is routed to a subscriber unit registered in the macrocellular communication network. And, in yet another aspect of the present invention, calls are placed between a mobile subscriber unit positioned in a "home" microcellular network to a mobile subscriber unit roaming in a "visited" microcellular communication network. And, in yet another aspect of the present invention, the mobile subscriber unit forms a dual-mode subscriber unit, operable in both a microcellular network and a macrocellular network. Calls are placed, or received, by the subscriber unit when the subscriber unit is positioned in its "home" microcellular network, a visited microcellular network, or within an area encompassed only by the macrocellular network.

The present invention further advantageously permits communications between the microcellular and macrocellular communication networks by way of an Internet communication channel. Mobility management information, for example, is encapsulated according to an Internet protocol, or the like, and thereafter communicated by way of the Internet forming a connection between the microcellular and macrocellular communication networks. Because communications between the microcellular and macrocellular communication networks are effectuated by way of the Internet, direct connections between the separate networks are not required. The Internet, already existent and readily accessible, can thereby be utilized both to facilitate data communications and also telephony communications.

In these and other aspects, therefore, mobility-enhancing apparatus for a first mobility server facilitates communication with a mobile subscriber unit. The mobile subscriber unit is operable in a first microcellular communication network of a communication system having a macrocellular communication network and at least the first microcellular communication network. The first microcellular communication network includes the first mobility server. The mobility-enhancing apparatus facilitates communication with the mobile subscriber unit, operable in the first microcellular communication network, in a communication network other than the first microcellular communication network. A storage device stores location information representative of positioning of the mobile subscriber unit. A mobility manager is coupled to the storage device and to the macrocellular network. The mobility manager at least updates the location information stored in the storage device to indicate whether the mobile subscriber unit is positioned within range of the first microcellular communication network. The mobility manager further receives macrocellular network-generated data related to the mobile subscriber unit, and the network-generated data is used for the updating of the location information.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
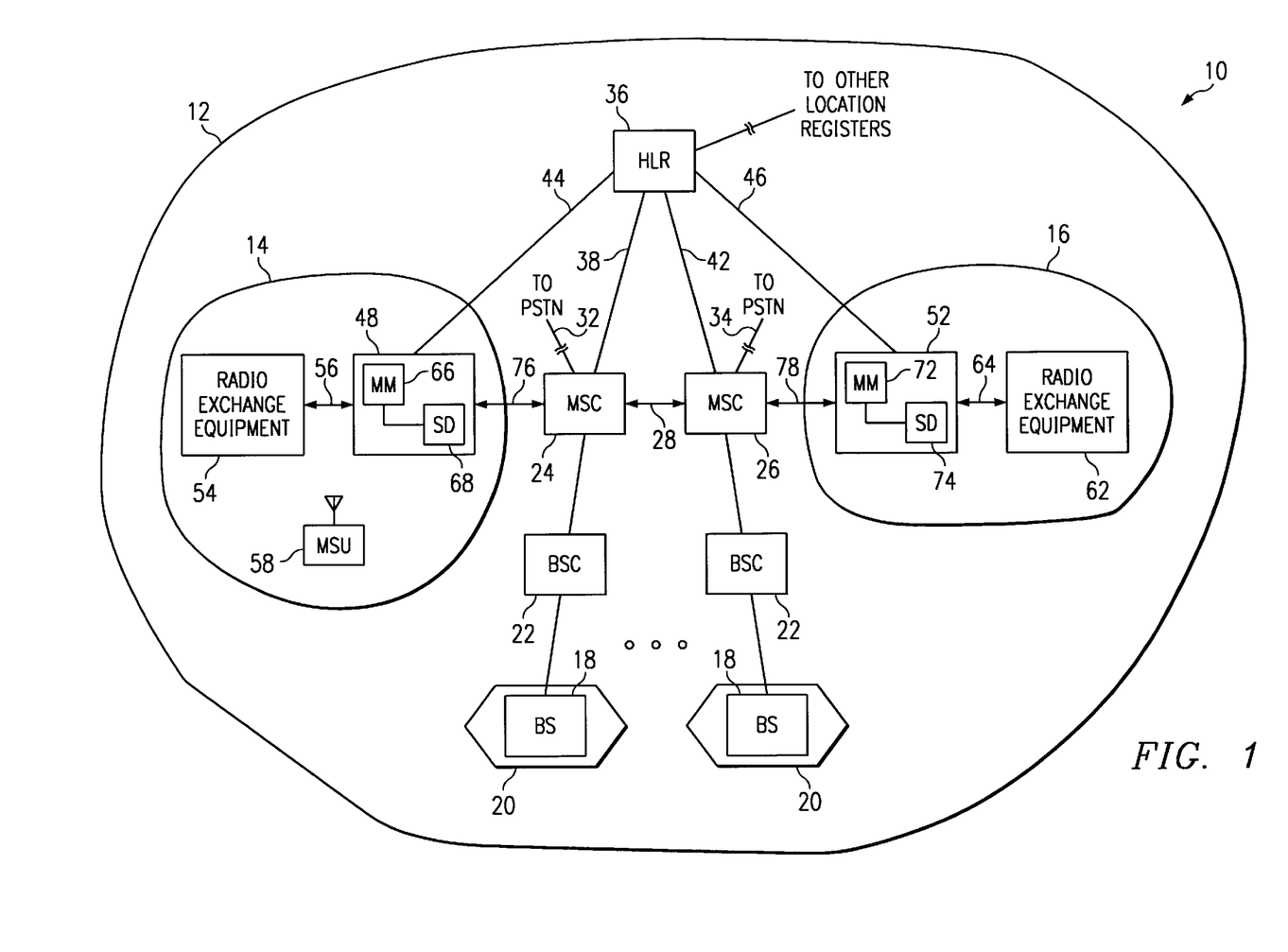
FIG. 1 illustrates a functional block diagram of a communication system which includes an embodiment of the present invention as a portion thereof.

Referring first to FIG. 1, a communication system, shown generally at 10, includes an embodiment of the present invention as a portion thereof. The communication system 10 is a multi-network communication system, here shown to include a macrocellular communication network 12, a first microcellular communication network 14, and a second microcellular communication network 16.

The microcellular communication network 12, for purposes of illustration, in the exemplary embodiment, is formed of a Global Systems for Mobile communications (GSM) network. In other embodiments, the macrocellular communication network 12 is alternatively formed of another type of Public Land Mobile Network (PLMN). Analogously, the first and second microcellular communication networks 14 and 16, respectively, are, in the exemplary embodiment, formed of Digital Electronic Cordless Telephone (DECT) systems. The microcellular networks 14 and 16 shall, at times, be referred to as DECT systems. In another embodiment, the networks 14 and 16 are alternatively formed of other types of Private Telephonic Networks (PTNs).

The macrocellular communication network 12 encompasses a macrocellular-region throughout which wireless communications by way of the network 12 are permitted. In conventional manner, the network 12 includes a plurality of spaced-apart base stations, of which two base stations 18 are illustrated in the figure. Each base station 18 encompasses an area defining a cell 20. The cells 20 defined by the base stations 18 collectively form the region encompassed by the network 12.

The base stations are coupled by way of base station controllers 22 to mobile services switching centers (MSCs), such as the mobile services switching centers 24 and 26. The base station controllers 22 are operable, inter alia, to control operation of the base stations 18 coupled thereto. Control operations, such as hand-off decisions and channel allocations, are performed at the controllers 22. Operation of the base station controllers 22, and the mobile services switching centers 24 and 26 of the exemplary embodiment corresponds generally with operation of such devices in existing standards specifications.

The mobile services switching centers 24 and 26 shown in the figure are inter-coupled, here indicated by the lines 28. The MSCs 24 and 26 are further coupled to a Public Switched Telephone Network (PSTN). Such couplings are illustrated by lines 32 and 34, respectively, in the figure.

The GSM network 12 further includes location registers including the home location register (HLR) 36. The HLR 36 is coupled to the MSCs 24 and 26 by way of lines 38 and 42, respectively. The HLR 36 is operable in the GSM communication network 12, inter alia, to perform wide-area mobility management functions to facilitate call routing to and from mobile subscriber units operable to communicate by way of the communication network 12. Such mobility management functions include, for instance, the maintenance of a subscriber registry. The subscriber registry contains information relating to the subscriber units' whereabouts and status.

The HLR 36 is further coupled, by way of lines 44 and 46, respectively, to mobility servers 48 and 52 of the DECT systems 14 and 16, respectively. In an exemplary embodiment, the mobility servers 48 and 52 are based on MD 110 hardware components. Services supported therefrom are developed on an Erlang platform. Services performed by the mobility servers 48 and 52 include those which are conventionally provided by mobility servers of conventional DECT systems.

The mobility server 48 is coupled to radio exchange equipment 54 by way of lines 56. The radio exchange equipment 54 includes transceiver circuitry permitting communication with mobile subscriber units, such as the mobile subscriber unit 58. Similarly, the mobility server 52 is coupled to radio exchange equipment 62 by way of lines 64. Analogous to the radio exchange equipment 54, the radio exchange equipment 62 includes transceiver circuitry permitting wireless communications with mobile subscriber units positioned within the area encompassed by the DECT system 16.

In one embodiment, the mobile subscriber unit 58 forms a dual-mode subscriber unit, selectively operable to communicate with both the GSM network 12 and the microcellular networks 14 and 16.

The mobility server 48 includes a mobility manager 66 capable of communicating information with the HLR 36. The mobility manager 66 is further coupled to a storage device 68 which also forms a portion of the mobility server 48. Similarly, the mobility server 52 includes a mobility manager 72 which is capable of communicating information with the HLR 36. The mobility manager is further coupled to a storage device 74 which also forms a portion of the mobility server 52. The mobility server 48 is further coupled to the MSC 24, here indicated by lines 76. And, the mobility server 52 is further coupled to the MSC 26, here indicated by the lines 78. Both the mobility servers 48 and 52 are further coupled to a PSTN and provide conventional call routing of calls between the PSTN and mobile subscriber units which are regularly registered in the respective communication networks 14 and 16.

The storage devices 68 and 74 store location information related to subscriber units operable in the respective networks associated with the mobility servers 48 and 52, respectively. As shall be described below, such location information can be updated during operation of an embodiment of the present invention. In one embodiment, the storage devices 68 and 74 further store service subscription information related to service subscriptions to which the subscriber units are subscribed.

During operation of an embodiment of the present invention, the wide-area mobility management functions provided by the GSM network 12 are further utilized by the DECT systems forming the microcellular networks 14 and 16. Such utilization provides wide-area mobility to mobile subscriber units operable in the networks 14 and 16. Thereby, communications with mobile subscriber units of the networks 14 and 16 are permitted when such subscriber units roam beyond the areas encompassed by the networks in which the subscriber units are regularly registered, viz., the subscriber units' "home" network. For instance, when the mobile subscriber unit 58 roams beyond the microcellular network 14 and into, for instance, the microcellular network 16, the wide-area mobility management functions provided by the GSM network 12 are utilized to facilitate communications with the "roaming" mobile subscriber unit. In an embodiment having dual-mode subscriber units, the wide-area mobility management functions provided by the GSM network are utilized by the subscriber units when communicating by way of the networks 14 and 16 and also when communicating by way of the GSM network 16.

Mobile application part (MAP) interfaces are introduced into the mobility servers 48 and 52, respectively. In one embodiment, five MAP operations are supported by the MAP interface. Namely, update location, insert subscriber data, delete subscriber data, cancel location, and provide roaming number operations are supported by the MAP interface. Such operations are performed, as necessary, to permit communications with the subscriber unit when the subscriber unit roams beyond its home network.

Subscription information associated with mobile subscriber units, such as the subscriber unit 58, operable in the DECT network 14 are stored not only in the mobility server 48 but also in the HLR 36. Services pursuant to the subscription in the HLR 36, however, need not be defined. But, the subscriber unit 58 includes an MSISDN number and an IMSI number allocated thereto. The subscription for the subscriber unit in the HLR 36 is based on such numbers.

The mobility server 48 contains tables permitting transformation between a DECT identity, used to identify the subscriber unit in the DECT system 14 and the MSISDN and IMSI numbers, used to identify the subscriber unit in the GSM network 12.

The DECT identity, the IMSI, and the MSISDN allocated to the subscriber unit 58 are further defined in each mobility server, such as the mobility server 52, in each DECT system 16, or other PTN, in which the subscriber unit 58 is permitted to roam. Such information is predefined in the mobility servers. Such predefined information further includes a predefined service profile which, in one embodiment, is not otherwise transferred from the subscriber units' 58 home mobility server, here server 48, to a visited mobility server, here server 52. Each mobility server further includes a series of roaming numbers which are defined in manners similar to the roaming numbers defined in a mobile services switching center or location register of a conventional GSM network. Signaling between the MSCs 24 and 26 and the HLR 36 is routed by using a global title (GT) and subsystem number (SSN). Thereby, the mobility servers 48 and 52 appear to the HLR 36 as mobile services switching centers, similar to the switching centers 24 and 26. The mobility servers further include unique MSC/VLR addresses, similar to the MSC/VLR addresses which identify the MSCs of the macrocellular network 12.

FIG. 2 illustrates again the HLR 36 of the GSM network 12 and the mobility servers 48 and 52 of the DECT systems 14 and 16, respectively. Lines 44 and 46 are again shown to couple the HLR 36 with the mobility servers 48 and 52, respectively. And, the radio exchange equipment 54 and 62 are again shown to be coupled to the respective mobility servers 48 and 52. When a mobile subscriber unit, here subscriber unit 58, roams out of the microcellular network 14, its home network, and into the microcellular network 16, the subscriber unit 58 registers with the mobility server 52. The roaming of the subscriber unit is indicated in the figure by the arrow 84. The identity of the subscriber unit 58 is indexed against a list of subscriber units permitted to roam. A subscriber unit 58 is assumed to be listed on such list and a transformation between the DECT identity of the subscriber unit 58 and its corresponding IMSI number is performed by the mobility manager 72.

Figure 2:
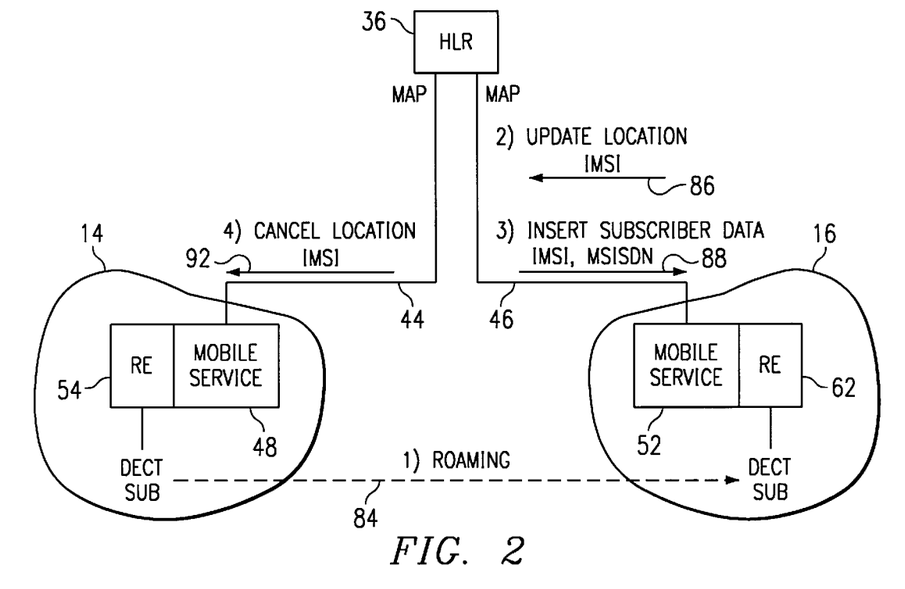
FIG. 2 illustrates a functional block diagram of a portion of the communication system shown in FIG. 1 used during operation of an embodiment of the present invention to update the location of a mobile subscriber unit when the mobile subscriber unit roams into an area encompassed by a microcellular communication network other than the "home" microcellular network in which the subscriber unit is regularly registered.

Second, as indicated by the arrow 86, the mobility server 52 updates the location information of the subscriber unit with the HLR 36. Then, and as indicated by the arrow 88, the HLR 36 provides the mobility server 52 with subscriber data, namely the IMSI and MSISDN numbers, stored in the HLR 36. And, as indicated by the arrow 92, the HLR 36 causes the mobility server 48 to deregister the old registration of the subscriber unit 58 in the network 14. Thereby, the location of the subscriber unit 58 is updated to indicate its location in the area encompassed by the microcellular network 16, not the microcellular network 14.

Figure 3:
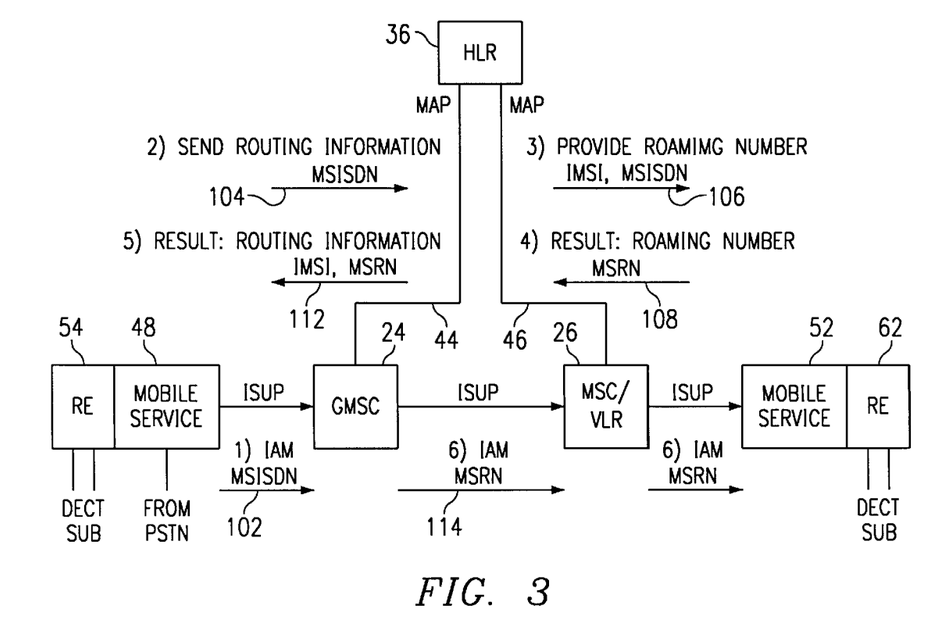
FIG. 3 illustrates a functional block diagram of a portion of the communication system shown in FIG. 1 used during operation of an embodiment of the present invention when the mobile subscriber unit roams into an area encompassed by a microcellular communication network other than the "home" network in which the subscriber unit is regularly registered.

FIG. 3 illustrates operation of an embodiment of the present invention by which a call is routed to the subscriber unit 58, regularly registered at the network 14, when the subscriber unit 58 roams into the network 16. Elements of the communication system 10 utilized in the exemplary operation of call routing to the roaming, subscriber unit 58 are shown in FIG. 3 and identified by the same reference numerals used to identify such elements in FIG. 1.

When the mobility server 48 receives a call, such as a call originated at the PSTN to be terminated at the mobile subscriber unit, the identity of the subscriber unit is indexed against a list of subscriber units permitted to roam. The subscriber unit 58 is assumed to be on the list and marked as being roaming beyond the network 14. The mobility manager of the mobility server 48 translates the DECT identity of the subscriber unit into an MSISDN number, and the call is routed to the MSC 24, here forming a gateway MSC (GMSC). Such routing is indicated in the FIGURE by the arrow 102. Then, and as indicated by the arrow 104, the MSC 24 interrogates the HLR 36 for routing information to route the call to the roaming, subscriber unit.

Responsive to the interrogation, the HLR 36 requests a roaming number, MSRN, from the mobility server 52, as indicated by the arrow 106. The mobility server 52 returns the roaming number allocated to the subscriber unit 58 to the HLR 36, as indicated by the arrow 108. The HLR 36 thereafter, and as indicated by the arrow 112, returns the roaming number allocated to the subscriber unit 58 to the MSC 24. Once the roaming number is received at the MSC 24, the call is routed to the roaming, subscriber unit 58, as indicated by the arrows 114, by utilizing the roaming number. The MSC 24, in one embodiment, generates both a transit call data record and a roaming call forwarding record, for billing purposes, if desired.

Figure 4:
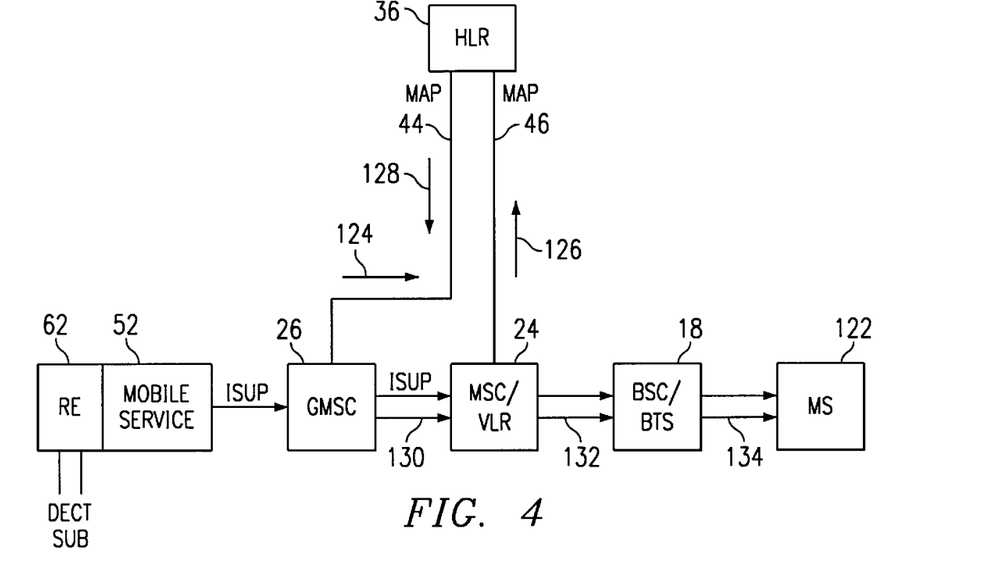
FIG. 4 illustrates a portion of the communication system shown in FIG. 1, used during operation of an embodiment of the present invention to route a call originated by a mobile subscriber unit when the mobile subscriber unit is positioned in an area encompassed by a microcellular communication network other than the "home" network in which the subscriber unit is regularly registered.

FIG. 4 illustrates operation of an embodiment of the present invention by which the wide-area management functions provided by the GSM network 12 of the communication system 10 are utilized to facilitate routing of a call originated at a roaming subscriber unit, here subscriber unit 52 to a mobile subscriber unit operable in the GSM network. Again, elements of the communication system 10 utilized during such operation are identified with the same reference numerals utilized to identify such elements in FIG. 1.

The subscriber unit 58 originates a call, indications of which are received by the radio exchange equipment 62. The call request is provided to the mobility server 52 and the mobility manager 72 thereof indexes the identity of the roaming, subscriber unit against a listing of subscriber units permitted to roam. The subscriber unit is assumed to be on the list and the predefined service profile associated therewith is used for the subscriber unit 58.

The call is set up by way of the MSC 26, here forming a gateway MSC (GMSC) and the DECT identity of the subscriber unit 58 is used as an A-number. The call is thereafter routed, in conventional fashion pursuant to the GSM network, to be terminated at the mobile subscriber, here a mobile subscriber 122. That is to say, the MSC 26 interrogates the HLR, as indicated by the arrow 124, for routing information. Such routing information is received at the HLR 36 from the MSC 24, as indicated by the arrow 126, and a visited location register (not shown) associated therewith. The routing information is provided to the MSC 26, as indicated by the arrow 128. Responsive to the routing information, the call is routed from the MSC 26, to the MSC 24, as indicated by the arrow 130, and thereafter to the appropriate base station 18, as indicated by the arrow 132. The call is thereafter terminated at the mobile station 122, as indicated by the arrow 134.

Figure 5:
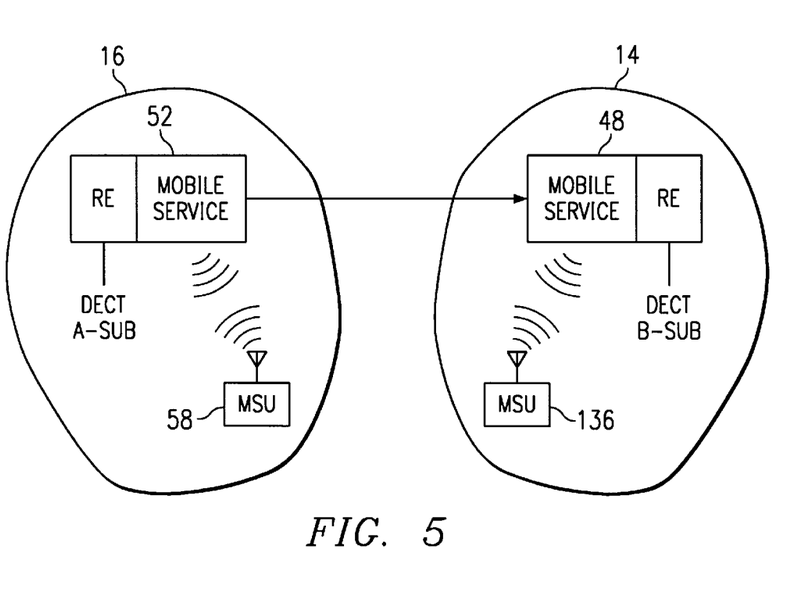
FIG. 5 illustrates a portion of the communication system shown in FIG. 1 used during operation of an embodiment of the present invention to route a call between subscriber units positioned in different microcellular communication networks.

FIG. 5 illustrates operation of an embodiment of the present invention which permits routing of a call originated by a roaming, subscriber unit, here subscriber unit 58, to another subscriber unit, here subscriber unit 136, positioned in another DECT network, here DECT network 14. The roaming, subscriber unit 58 generates a call to the subscriber unit 136. The identity of the subscriber unit 58 is indexed against a list of permitted roaming subscriber units. The subscriber unit 58 is assumed to be listed on the list, and a predefined profile is allocated to the subscriber unit. The identity of the subscriber unit 136 is also indexed against a list of permitted roaming, subscriber units. Here, the subscriber unit 136 is assumed not to be listed upon the list of subscriber units permitted to roam. The call is thereby routed as an ordinary call between two DECT networks.

Figure 6:
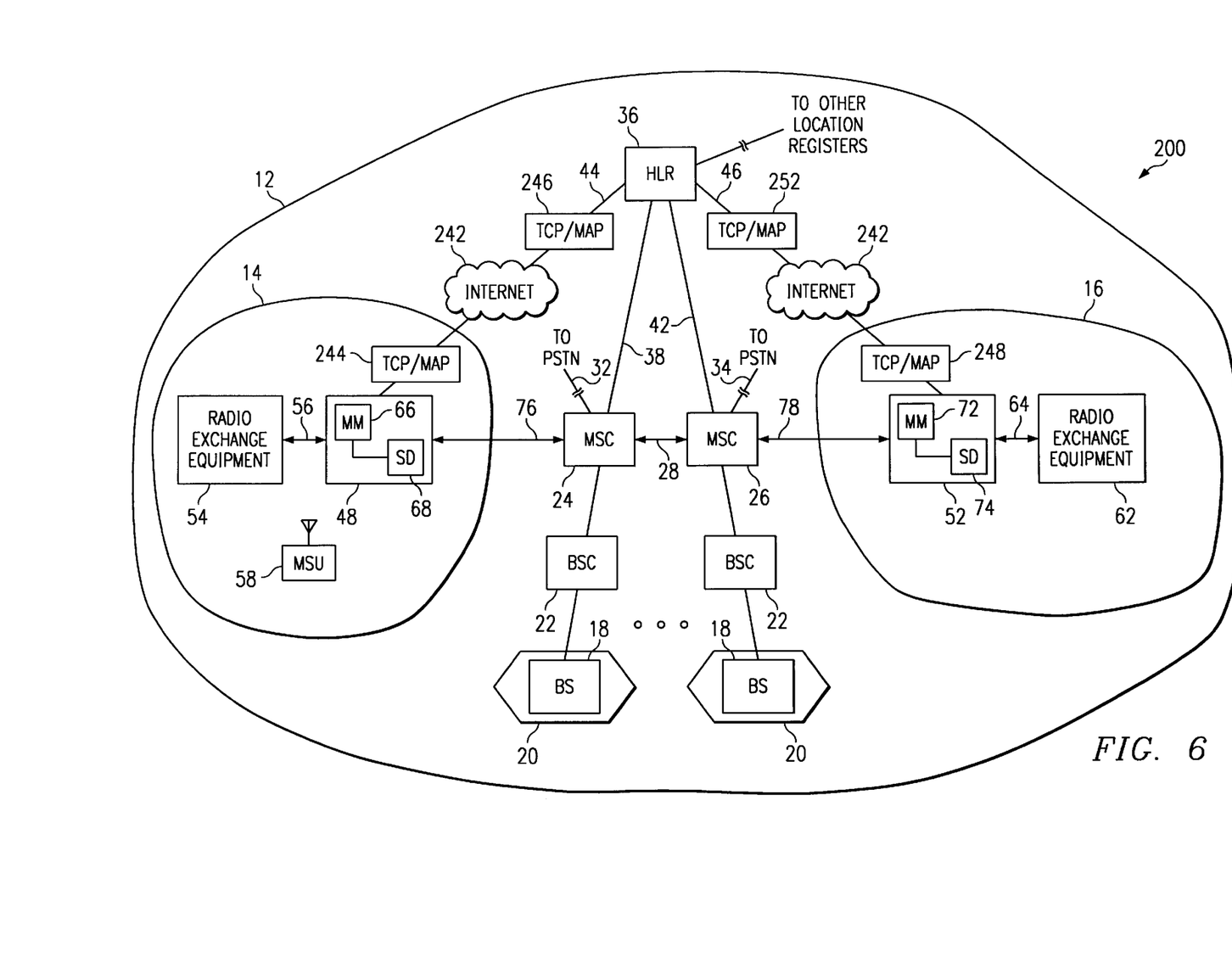
FIG. 6 illustrates a functional block diagram of a communication system which includes another embodiment of the present invention.

FIG. 6 illustrates a communication system, shown generally at 200, of another embodiment of the present invention. The communication system 200 is, analogous to the communication system 10 shown in FIG. 1, a multi-network communication system, again including a microcellular communication network 12 and at least two microcellular communication networks, here communication networks 14 and 16. The networks 12, 14 and 16 include the same elements as those previously shown in FIG. 1. Such corresponding elements are again identified by the same reference numerals as those used in FIG. 1.

Again, the macrocellular communication network 12 forms a GSM communication network having base stations 18, each of which defines a cell 20. The base stations 18 are coupled via the base station controllers 22 to mobile services switching centers (MSCs), such as the MSC 24 and 26. The MSCs 24 and 26 are connected together by way of lines 28.

The MSCs 24 and 26 are also coupled to a PSTN, here indicated by way of lines 32 and 34, respectively. The MSCs 24 and 26 are further coupled to an HLR 36 by way of lines 38 and 42, respectively.

The network 14 includes a mobility server 48, and the network 16 includes a mobility server 52. The mobility server 48 is coupled to radio exchange equipment 54 which includes radio transceivers for communicating with mobile subscriber units, such as the mobile subscriber unit 58. And, radio exchange equipment 62 is coupled to the mobility server 52 by way of lines 64.

The mobility server 48 is again shown to include a mobility manager 66 and a storage device 68. And, the mobility server 52 is again shown to include a mobility manager 72 and a storage device 74. The mobility server 48 is coupled to the MSC 24 by way of lines 76, and the mobility server 52 is coupled to the MSC 26 by way of lines 78.

In the communication system 200, the HLR 36 is not directly coupled to the mobility servers 48 and 52. Rather, the HLR 36 is indirectly coupled to the mobility servers by way of the Internet 242 which here forms an internet communication channel indirectly connecting the HLR 36 and the mobility servers 48 and 52. The Internet 242 forms a connection between the HLR 36 and the mobility servers.

The mobility server 48 is coupled, such as by way of a local area network (not shown in the figure) to a TCP mobile application part (TCP/MAP) 244. The TCP/MAP 244 encapsulates information to be transmitted to the HLR 36 according to an internet protocol (IP), or other appropriate protocol. Similarly, a TCP/MAP 246 encapsulates data to be transmitted to the mobility server 48 according to an internet protocol, or the like. The TCP/MAP 244 is further operable to de-encapsulate information transmitted thereto. And, similarly, the TCP/MAP 246 is further operable to de-encapsulate information transmitted thereto. In like fashion, TCP/MAPs 248 and 252 encapsulate and de-encapsulate data to be transmitted between the HLR 36 and the mobility server 52 to permit its transmission by way of the internet 242. Because the internet permits communications to be effectuated between the HLR 36 and the mobility servers 48 and 52 without requiring that a direct connection be formed therebetween, security issues arising when an operator of the network 12 differs with the operator, or operators, of the networks 14 and 16 are avoided. Direct signaling, such as CCITT 7 signaling, is not required to effectuate communication of information needed to provide the networks 14 and 16 with the wide-area mobility functions of the network 12.

Operation of the present invention permits wide-area mobility management functions provided by a macrocellular communication network to be utilized by a microcellular communication network to facilitate communication with a mobile subscriber. A mobile subscriber regularly registered in one microcellular communication network can roam to another microcellular communication network and utilize the wide-area mobility permitted in a macrocellular communication network to route calls to the roaming, subscriber unit.

The previous descriptions are preferred examples for implementing the invention, and the scope of the invention should not necessarily be limited by this description. The scope of the present invention is defined by the following claims.

What is claimed is:

1. In a communication system having a macrocellular communication network and first and second microcellular communication networks, the macrocellular communication network operable to communicate with mobile subscriber units according to a first wireless communication interface, the first and second microcellular communication networks operable to communicate with mobile subscriber units according to a further wireless communication interface other than said first wireless communication interface, the first microcellular communication network having a first mobility server that provides mobility management for mobile subscriber units roaming through the first microcellular communication network, an improvement of mobility-enhancing apparatus cooperable with the first mobility server for facilitating communication with a mobile subscriber unit which is home-registered in the first microcellular communication network but has roamed into the second microcellular communication network, said apparatus comprising:

means for coupling the first and second microcellular communication networks to the macrocellular communication network;

a first storage device in the mobility server for storing location information representative of positioning of the mobile subscriber unit, said first storage device also for storing therein a corresponding relationship between microcellular identity information used by the first microcellular network to identify the mobile subscriber unit and macrocellular identity information used by the macrocellular network to identify the mobile subscriber unit; and a first mobility manager provided in the mobility server and coupled to said first storage device and to the macrocellular network, said first mobility manager at least for updating the location information stored in said storage device to indicate whether the mobile subscriber unit is positioned within range of the first microcellular communication network and for receiving macrocellular network-generated mobility management data related to the mobile subscriber unit, the macrocellular network-generated mobility-management data generated when the mobile subscriber unit has roamed into the second microcellular communication network and used for the updating of the location information.

2. The apparatus of claim 1 wherein the macrocellular network comprises a home location register and wherein the macrocellular network-generated data is generated by the home location register.

3. The apparatus of claim 2 wherein said first mobility manager is coupled to the home location register by way of an Internet communication channel.

4. The apparatus of claim 3 further comprising means for interfacing said first mobility manager with the Internet communication channel.

5. The apparatus of claim 3 wherein the first mobility server is operable to receive a call request requesting call communications with the mobile subscriber unit and wherein the location information stored in said first storage device is utilized to route the call request to the mobile subscriber unit.

6. The apparatus of claim 3 wherein the communication system further comprises a remote communication station operable in the macrocellular communication network, wherein the first mobility server is operable to receive call requests from the mobile subscriber unit requesting call communications with the remote communication station, and wherein said first storage device further stores a service profile, the service profile accessed by said first mobility manager prior to routing the call request to the macrocellular communication network.

7. The apparatus of claim 2 wherein the second microcellular network has a second mobility server, the second mobility server coupled to the home location register, and wherein the macrocellular network-generated data generated by the home location register is generated responsive to update data supplied thereto by the second mobility server.

8. The apparatus of claim 7 wherein said first storage device further stores roaming identity information which identifies the mobile subscriber unit when the mobile subscriber unit is positioned beyond the range of the first microcellular communication network.

9. The apparatus of claim 2 wherein the macrocellular communication network further comprises a gateway mobile services switching center and wherein said first mobility manager is coupled to the gateway mobile services switching center to communicate therewith.

10. The apparatus of claim 1 wherein the second microcellular communication network has a second mobility server, said second mobility server having: a second storage device and a second mobility manager coupled thereto, wherein the first and second mobility servers, respectively, are coupled theretogether, and wherein said first mobility manager further provides private branch exchange service to the mobile subscriber unit when positioned at locations encompassed by at least either the first microcellular communication network or the second microcellular communication network.

11. The apparatus of claim 10 wherein said first storage device further stores a service profile, the service profile including information indicative of services to which the mobile subscriber unit is subscribed, and wherein the service profile is accessed by said first mobility manager when the mobile subscriber unit requests a call when positioned at the locations encompassed by at least either the first microcellular communication network or the second microcellular communication network.

12. The apparatus of claim 1 wherein said first mobility manager is cooperable with said first storage device to translate signals, which have been applied to the first mobility server and which identify the mobile subscriber unit in terms of one of the microcellular identity and the macrocellular identity, into signals which identify the mobile subscriber unit in terms of the other of the microcellular identity and the macrocellular identity.

13. The apparatus of claim 1 wherein said first storage device further stores data representative of services to which the mobile subscriber unit is subscribed.

14. The apparatus of claim 1 wherein the macrocellular network-generated data is of values to cause said first mobility manager to deregister the mobile subscriber unit and wherein said first mobility manager updates the location of the mobile subscriber unit by deregistering the location information stored in said first storage device.

15. In a method for communicating in a communication system having a macrocellular communication network and first and second microcellular communication networks, the macrocellular communication network operable to communicate with mobile subscriber units according to a first wireless communication interface, the first and second microcellular communication networks operable to communicate with mobile subscriber units according to a further wireless communication interface other than said first wireless communication interface, an improvement of a method for facilitating communication with a mobile subscriber unit which is home-registered in the first microcellular communication network but has roamed into the second microcellular communication network, said method comprising the steps of:

storing location information representative of positioning of the mobile subscriber unit;

providing to the first microcellular communication network macrocellular-generated mobility management data related to the mobile subscriber unit and generated by the macrocellular network when the mobile subscriber unit has roamed into the second microcellular communication network; and updating the location information stored during said step of storing responsive to reception of the macrocellular-generated mobility management data related to the mobile subscriber unit, including translating between microcellular identity information used by the first microcellular network to identify the mobile subscriber unit and macrocellular identity information used by the macrocellular network to identify the mobile subscriber unit.

16. In a method for communicating with a mobile subscriber unit that is home-registered in a first microcellular network, the first microcellular network forming a portion of a communication system that also includes a macrocellular network and a second microcellular network, the macrocellular network operable to communicate with mobile subscriber units according to a first wireless communication interface, the first and second microcellular networks operable to communicate with mobile subscriber units according to a further wireless communication interface other than said first wireless communication interface, an improvement of a method for facilitating communication with the mobile subscriber unit when the mobile subscriber unit roams beyond the first microcellular network and into the second microcellular network, said method comprising the steps of:

coupling the macrocellular network together with the first and second microcellular networks;

providing mobility management functions existent in the macrocellular network to the first microcellular network; and utilizing the mobility management functions in the first microcellular network when the mobile subscriber unit roams into the second microcellular network, thereby to provide the first microcellular network with wide area mobility management, and thereby to facilitate the communication with the mobile subscriber unit, said utilizing step including translating between microcellular identity information used by the first microcellular network to identify the mobile subscriber unit and macrocellular identity information used by the macrocellular network to identify the mobile subscriber unit.

17. An improvement of an apparatus for facilitating communication with a mobile subscriber unit in a communication system having a macrocellular communication network and having first and second microcellular communication networks, the macrocellular communication network operable to communicate with mobile subscriber units according to a first wireless communication interface, the first and second microcellular communication networks operable to communicate with mobile subscriber units according to a further wireless communication interface other than said first wireless communication interface, the mobile subscriber unit home-registered in the first microcellular communication network and operable at least to communicate with the first microcellular communication network when the mobile subscriber unit roams beyond the first microcellular communication network and into the second microcellular communication network, said apparatus comprising:

means for coupling the macrocellular communication network together with the first and second microcellular communication networks;

a mobility management function provider forming a portion of the macrocellular communication network, said mobility management function provider for providing mobility management functions existent in the macrocellular communication network to the first microcellular communication network by way of said coupling means; and a mobility server forming a portion of the first microcellular communication network, said mobility server for utilizing the mobility management functions when the mobile subscriber unit roams into the second microcellular communication network, thereby to provide the first microcellular communication network with wide area mobility management, and thereby to facilitate the communication with the mobile subscriber unit, said mobility server operable to translate between microcellular identity information used by the first microcellular network to identify the mobile subscriber unit and macrocellular identity information used by the macrocellular network to identify the mobile subscriber unit.

* * * * *